(12) United States Patent
Gough et al.

(10) Patent No.: US 10,726,636 B2
(45) Date of Patent: Jul. 28, 2020

(54) SYSTEMS AND METHODS TO ADAPT AN INTERACTIVE EXPERIENCE BASED ON USER HEIGHT

(71) Applicant: Disney Enterprises, Inc., Burbank, CA (US)

(72) Inventors: R. Hunter Gough, Burbank, CA (US); Jason Yeung, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/161,424

(22) Filed: Oct. 16, 2018

(65) Prior Publication Data

US 2020/0118346 A1    Apr. 16, 2020

(51) Int. Cl.
  *G06T 19/20*    (2011.01)
  *G02B 27/01*    (2006.01)
  *G06T 15/20*    (2011.01)
  *G06T 17/05*    (2011.01)

(52) U.S. Cl.
  CPC .......... *G06T 19/20* (2013.01); *G02B 27/017* (2013.01); *G06T 15/20* (2013.01); *G06T 17/05* (2013.01)

(58) Field of Classification Search
  CPC .............................. G06T 19/20; G02B 27/017
  See application file for complete search history.

(56) References Cited

U.S. PATENT DOCUMENTS

| | | | |
|---|---|---|---|
| 2010/0265519 A1* | 10/2010 | Takimasa | G01B 11/0608 356/624 |
| 2015/0242763 A1* | 8/2015 | Zamer | G06Q 10/02 705/5 |
| 2015/0308091 A1* | 10/2015 | Foust | E03D 13/00 4/309 |
| 2016/0189426 A1* | 6/2016 | Thomas | G06T 19/006 345/633 |
| 2017/0278306 A1* | 9/2017 | Rico | G06T 19/006 |
| 2018/0158244 A1* | 6/2018 | Ybanez Zepeda | G06F 3/017 |

* cited by examiner

*Primary Examiner* — Yi Yang
(74) *Attorney, Agent, or Firm* — Esplin & Associates, PC (57) ABSTRACT

This disclosure presents systems and methods to adapt an interactive experience based on user height. Presence of a beacon within a real-world environment may be detected. A set of vertical displacements between the beacon and a presentation device installed on a head of a user may be determined over a period of time. An average vertical displacement may be determined from the set of vertical displacements. A value of a height dimension of a virtual object may be specified based on the average vertical displacement.

20 Claims, 5 Drawing Sheets

SYSTEMS AND METHODS TO ADAPT AN INTERACTIVE EXPERIENCE BASED ON USER HEIGHT

FIELD

This disclosure relates to systems and methods to adapt an interactive experience based on user height.

BACKGROUND

Devices and systems are available to provide virtual reality (VR) and/or augmented reality (AR) experiences. In particular, handheld and/or wearable technology may be used. Wearable technology may include head-mounted displays (HMD). Handheld technology may include mobile computing platforms, such as smart phones and/or tablets.

SUMMARY

One aspect of the disclosure relates to a system configured to adapt an interactive experience based on user height. Interactive experiences may take place in an interactive environment. An interactive environment may include one or more of a virtual reality environment, an augmented reality environment, and/or other interactive environments. An augmented reality environment may include views of images of virtual content in a virtual environment superimposed over views of a real-world environment. A virtual reality environment may include views of images of virtual content within a virtual environment. Virtual content may include one or more virtual objects, one or more virtual characters, and/or other virtual content. The terms "space" and "environment" in the context of virtual reality and/or augmented reality may be used interchangeably herein.

The system may include one or more of one or more presentation devices, one or more beacons, non-transitory electronic storage, and/or other components. The non-transitory electronic storage may be configured to store virtual content information and/or other information. The virtual content information may define virtual content. The virtual content may include one or more virtual objects. The individual virtual objects may have spatial dimensions including a height dimension and/or other dimensions. An individual virtual object may have a default position at rest with respect to a surface in the real-world environment it would be held on by gravity if it were a real-world object. The height dimension of the individual virtual object may be a vertical distance individual virtual object extends away from the surface in the default position. The surface may include, for example, a tabletop, a floor, and/or other surface. The vertical distance may be specified with respect to a gravity vector.

The one or more physical beacons may be present in a real-world environment. An individual beacon may provide a reference point for placing virtual content within the real-world environment. In some implementations, a reference point for an individual beacon may facilitate identification of a surface in the real-world on which the individual beacons, and therefor a virtual object, may be placed.

A presentation device configured to be installed on a head of a user. The presentation device may be configured to generate images of virtual content and present the images such that the virtual content may be perceived by the user as being located in a real-world environment.

The presentation device may include one or more physical processors configured by machine-readable instructions. The machine-readable instructions may include one or more computing program components. Executing the machine-readable instructions may cause the one or more physical processors to facilitate adapting an interactive experience based on user height. The computer program components may include one or more of a detection component, a height component, a control component, and/or other components.

The detection component may be configured to detect presence of a beacon within the real-world environment.

The height component may be configured to determine a set of vertical displacements between the beacon and the presentation device over a period of time. The height component may be configured to determine an average vertical displacement from the set of vertical displacements.

The content component may be configured to specify a value of the height dimension of a first virtual object based on the average vertical displacement and/or other information.

The control component may be configured to control the presentation device to generate an image of the first virtual object having the value of the height dimension specified based on the average vertical displacement.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
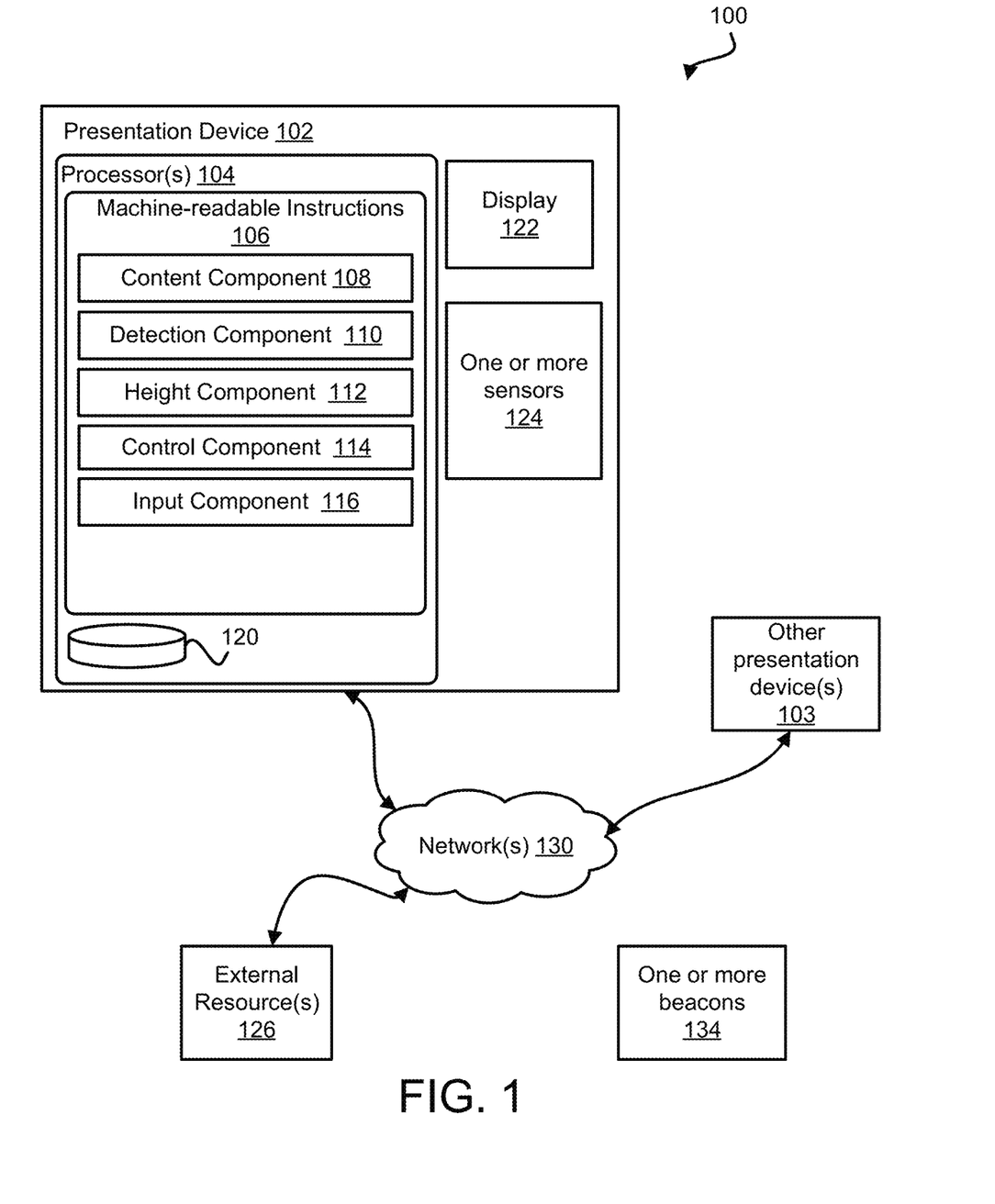
FIG. 1 illustrates a system configured to adapt an interactive experience based on user height, in accordance with one or more implementations.

FIG. 1 illustrates a system 100 configured to adapt an interactive experience based on user height, in accordance with one or more implementations. Interactive experiences may include one or more of playing a game, interacting with virtual content, interacting with real-world objects, interacting with other users, and/or other experiences. Interactive experiences may take place in an interactive space. An interactive space may include one or more of an augmented reality (AR) environment, a virtual reality (VR) environment, and/or other interactive spaces. An augmented reality environment may include views of images of virtual content within a virtual environment superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

In some interactive experiences, virtual objects may be placed at a 1:1 scale in the real world. If the focus of the experience is on a virtual tabletop or some other surface designed to be a certain height relative to a user, this virtual object may typically be rendered with a pre-determined perceived real-world height. For example, the virtual object may be designed for a user of average height. This may create a diminished experience for user whose heights diverge from the average, and/or for seated users. Accordingly, one or more implementations of the system 100 presented herein propose adapting one or more dimensions of virtual objects based on individual heights of users participating in an interactive experience. In some implementations, a height of a user may be dictated by a vertical displacement between a surface on which a virtual object may be placed and a presentation device worn on a head of the user.

The system 100 may include one or more of a presentation device 102, one or more other presentation devices 103, one or more beacons 134, one or more external resources 126, and/or other components. While some descriptions herein may be directed to configuration of the features and/or functions of presentation device 102, it is to be noted that other ones of one or more other presentation devices 103 may be similarly configured.

The presentation device 102 may include one or more of one or more physical processors 104 (also referred to as "processor(s) 104"), non-transitory electronic storage 120, a display 122, one or more sensors 124, and/or other components.

One or more physical processors 104 may be configured to provide information-processing capabilities in presentation device 102. As such, in some implementations, processor(s) 104 may include one or more of a digital processor, an analog processor, a digital circuit designed to process information, an analog circuit designed to process information, a state machine, and/or other mechanisms for electronically processing information.

In some implementations, one or more physical processors 104 may be configured to provide remote hosting of features and/or functions of machine-readable instructions 106 to presentation device 102. In some implementations, one or more physical processors 104 may be remotely located from presentation device 102. The one or more physical processors 104 may communicate with presentation device 102, via client/server architecture, and/or other communication schemes. By way of non-limiting illustration, one or more physical processors 104 may comprise one or more servers and/or one or more computing platforms.

In some implementations, one or more physical processors 104 may be configured to provide local hosting of features and/or functions of machine-readable instructions 106 to presentation device 102. In some implementations, one or more physical processors 104 may be included with and/or coupled to presentation device 102. The one or more physical processors 104 may communicate with presentation device 102 via local wired and/or wireless connections (e.g., USB, BLE and/or other connections), and/or other communication schemes.

In some implementations, one or more physical processors 104 may be removably coupled to presentation device 102. By way of non-limiting illustration, one or more physical processors 104 may be included in a mobile computing platform (not shown in FIG. 1). The mobile computing platform may include one or more of a cellular telephone, a smartphone, a laptop, a tablet computer, an AR/VR platform, and/or other computing platform. The mobile computing platform may be removably attachable to presentation device 102.

The display 122 may be configured to present virtual content. Virtual content may be in the form of images, video, text, and/or other content. Presentation of images, video, text, and/or other content via display 122 of presentation device 102 may be facilitated by control signals communicated to display 122 (see, e.g., control component 114). The display 122 may include one or more of a screen, a set of screens, a touchscreen, a monitor, a transparent display (e.g., a visor), a semi-transparent display, and/or other displays. In some implementations, display 122 may be configured to present content individually to each eye of a user as stereoscopic pairs. In some implementations, presentation device 102 may comprise, for example, a headset (not shown in FIG. 1). When presentation device 102 is installed on a user's head, the user's gaze may be directed towards presentation device 102 (or at least display 122) to view content presented by and/or on display 122.

In some implementations, display 122 may include one or more of a transparent, semi-transparent, reflective, and/or semi-reflective display component. Images of virtual content may be presented on display 122 such that the user may view the images presented on display 122 as well as the real-world through display 122. The virtual content may be perceived as being present in the real world. Such a configuration may provide an interactive space comprising an augmented reality environment.

In some implementations, display 122 may comprise a display screen configured to present virtual content. The user may view the display screen such that the display screen may encompass, substantially or entirely, the users field of view without providing views of the real-world through the display screen. Such a configuration may provide an interactive space comprising a virtual reality environment.

Individual sensors of one or more sensors 124 may be configured to generate output signals. In some implementations, an individual sensor may include one or more of an orientation sensor, a depth sensor, an image sensor, and/or other sensors.

An orientation sensor may be configured to generate output signals conveying orientation information and/or other information. Orientation information derived from output signals of an orientation sensor may define an orientation of presentation device 102. In some implementations, orientation of presentation device 102 may refer to one or more of a pitch angle, a roll angle, a yaw angle, a heading, and/or other measurements. An orientation sensor may include an inertial measurement unit (IMU) such as one or more of an accelerometer, a gyroscope, a magnetometer, Inclinometers, and/or other devices.

In some implementations, an image sensor may be configured to generate output signals conveying image information. Image information may define images of the real world. Image information may specify visual content within a field of view of the image sensor. The visual content may include real-world objects and/or surfaces present in the real world. The image information may specify visual content in the form of pixels in an image. Pixels may be defined by one or more of location (e.g., two-dimensional coordinates), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

The images of the real world may be used to detect presence of physical objects in the real-world and/or identifying physical objects (see, e.g., detection component 110). Detection of presence of physical object and/or identification of physical objects may be performed using one or more image-processing techniques. One or more image processing techniques may include one or more of bundle adjustment, speeded up robust features (SURF), scale-invariant feature transform (SIFT), computer vision, and/or other techniques.

In some implementations, a depth sensor may be configured to generate output signals conveying depth information and/or other information. Depth information may include distance and/or range of real-world surfaces and/or objects from the depth sensor, and/or other information. In some implementations, depth information may be provided in the form of a point cloud. A point cloud may include a set of points. Individual points may represent individual surfaces within the real world. The depth information may specify, for individual points, one or more of an individual distance of the point from the depth sensor, an individual orientation of the point with respect to the depth sensor, and/or other information. In some implementations, a depth sensor may comprise one or more of a time-of-flight sensor, a structured light sensor, an unstructured light sensor, an active stereo pair, a passive stereo pair, and/or other depth sensing devices.

The non-transitory electronic storage 120 may be configured to store virtual content information and/or other information. The virtual content information may define virtual content. The virtual content may include one or more virtual objects. Individual virtual objects may have spatial dimensions including one or more of a height dimension, a width dimension, a length dimension, and/or other dimensions. An individual virtual object may have a default position at rest with respect to a surface in the real-world environment it would be held on by gravity if it were a real world object. The height dimension of the individual virtual object may be a vertical distance individual virtual object extends away from the surface in the default position. The surface may include, for example, a tabletop, a floor, and/or other surface. The vertical distance may refer to a distance measured along a local gravity vector. The width dimension may refer to a measurement orthogonal to the height dimension and/or other dimensions. The length dimension may refer to a measurement orthogonal to the height dimension, the width dimension, and/or other dimensions In some implementations, individual beacons of one or more beacons 134 may be individual physical objects. In some implementations, individual beacons may include individual light sources disposed thereon, and/or other components. For example, one or more beacons 134 may include a first physical object with a first light source, and/or other physical objects with other light sources.

In some implementations, light source(s) of individual beacons may indicate a reference point for individual beacons within a real-world environment. The light source(s) may facilitate determination of a location of individual beacons in the real-world environment. In some implementations, light source(s) may facilitate determination of an orientation of individual beacons. In some implementations, light source(s) may facilitate identification of a surface in the real-world on which individual beacons may be placed. Light source(s) may include one or more sources of electromagnetic radiation. In some implementations, light source(s) may include one or more light emitting diodes, and/or other light sources. In some implementations, images may be presented by display 122 to cause a user of presentation device 102 to perceive virtual content as being present at the individual reference points provided by light source(s) of individual beacons.

The one or more physical processors 104 may be configured by machine-readable instructions 106. Executing machine-readable instructions 106 may cause one or more physical processors 104 to facilitate adapting an interactive experience based on user height. The machine-readable instructions 106 may include one or more computer program components. The one or more computer program components may include one or more of a content component 108, a detection component 110, a height component 112, a control component 114, an input component 116, and/or other components.

The content component 108 may be configured to obtain virtual content information and/or other information stored by electronic storage 120 and/or other storage locations.

The detection component 110 may be configured to detect presence of individual beacons of one or more beacons 134 within a real-world environment. In some implementations, detection component 110 may detect the presence of individual beacons within a field of view of an image sensor included in one or more sensors 124. Detection component 110 may obtain the output signals generated by the image sensor. Detection component 110 may detect the presence of individual beacons based on image information conveyed by the output signals, and/or other information. The image information may define visual content depicting one or more of individual beacons, light emitted by light source(s) of individual beacons, and/or other content. In some implementations, detecting presence of an individual beacon may include identifying a surface on which the individual beacon may be placed. In some implementations, detection component 110 may utilize one or more image processing techniques to detect presence and/or identify surfaces. One or more image processing techniques may include one or more of bundle adjustment, speeded up robust features (SURF), scale-invariant feature transform (SIFT), computer vision, and/or other techniques.

The height component 112 may be configured to determine a set of vertical displacements between an individual beacon and presentation device 102 over a period of time. The period of time may be in the range of one to ten seconds, and/or other period of time.

In some implementations, height component 112 may be configured to determine the set of vertical displacements from one or more of depth information conveyed by output signals of a depth sensor, image information conveyed by output signals of an image sensor, and/or other information. By way of non-limiting illustration, depth information may include distance and/or range of an individual beacon from the depth sensor, and/or other information. The distance and/or range of an individual beacon from the depth sensor may provide an adequate representation of distance and/or range of an individual beacon from presentation device 102 including the depth sensor. The distance and/or range of an individual beacon from the depth sensor may be used to determine vertical displacements between an individual beacon and presentation device 102, using conventional geometry and/or other considerations. Vertical may refer to a direction of a gravity vector. In some implementations, a quantity of vertical displacements in the set of vertical displacements may be determined based on a sampling rate of the depth sensor and the period of time.

An image sensor may be disposed in presentation device 102 installed on a head of a user. The image information may define images including depictions of individual beacons. The height component 112 may be configured determine a set of vertical displacements between an individual beacon and presentation device 102 using the image information and/or one or more image-processing techniques. In some implementations, a quantity of vertical displacements in the set of vertical displacements may be determined based on a sampling rate of the image sensor and the period of time.

The height component 112 may be configured to determine an average vertical displacement from the set of vertical displacements.

In some implementations, the content component 108 may be configured to specify individual values of the height dimension and/or other dimensions of individual virtual objects based on one or more of individual average vertical displacements, a predetermined fraction, and/or other information. By way of non-limiting illustration, content component 108 may be configured to specify a value of the height dimension of a first virtual object based on the average vertical displacement. Responsive to the average vertical displacement being a first value, content component 108 may be configured to specify the value of the height dimension of the first virtual object as a fraction of the first value. Responsive to the average vertical displacement being a second value, content component 108 may be configured to specify the value of the height dimension of the first virtual object as the fraction of the second value. In some implementations, the fraction may be between ⅔ and ¾, inclusive, and/or other value.

In some implementations, the content component 108 may be configured to specify individual values of the height dimension and/or other dimensions of individual virtual objects based on one or more of individual average vertical displacements, a predetermined distance, and/or other information. By way of non-limiting illustration, content component 108 may be configured to specify a value of the height dimension of a first virtual object based on an average vertical displacement and a predetermined displacement. In some implementations, the predetermined displacement may be subtracted from the average vertical displacement and set as the value of a height dimension and/or other dimension of the first virtual object. Responsive to the average vertical displacement being a first value, content component 108 may be configured to specify the value of the height dimension of the first virtual object as the first value less the predetermined displacement. By subtracting the predetermined displacement from the individual average vertical displacements for individual users, the individual users may have the same relative perception of the first virtual object. In some implementations, the predetermined displacement may be in the range of 50 to 100 centimeters. In some implementations, the predetermined displacement may be 70 centimeters.

An individual virtual object may have a default position at rest with respect to a surface in the real-world environment it would be held on by gravity if it were a real world object. The surface may be a surface identified as having a beacon placed thereon. The height dimension of the individual virtual object may be a vertical distance individual virtual object extends away from the surface in the default position. The surface may include, for example, a tabletop, a floor, and/or other surface.

The content component 108 may be configured to specify individual values of the height dimension and other dimensions of individual virtual objects based on one or more of individual average vertical displacements, a predetermined fraction, and/or other information. Specify individual values of the height dimension and other dimensions of individual virtual objects may comprise scaling the individual virtual objects as a whole. In some implementations, the individual values of the other dimensions may be specified in the same or similar manner as the height dimension, described herein.

The control component 114 may be configured to control presentation device 102 (e.g., via display 122) to generate and present individual images of individual virtual object having the individual values of the height dimension and/or other dimensions specified based on an average vertical displacement. By way of non-limiting illustration, control component 114 may be configured to control presentation device 102 to generate an image of the first virtual object having the value of the height dimension and/or other dimensions specified based on the average vertical displacement.

In some implementations, the input component 116 may be configured to obtain user input to modify the individual values of the height dimension of the individual virtual objects specified based on the average vertical displacement.

In some implementations, a user may utilize one or more of gesture-based input, a physical input device, and/or other techniques to provide user input to modify the individual values of the height dimension of the individual virtual objects.

In some implementations, a physical input device may include a handheld input device, and/or other devices. A handheld input device may be configured to receive physical input and/or gesture-based input. A handheld input device may include one or more physical input mechanisms, one or more virtual input mechanisms, and/or other elements. A physical input mechanism may include one or more of a button, a trigger, a joy-stick, and/or other mechanisms. A virtual input mechanism may include one or more of a virtual button (e.g., presented on a display screen), a virtual joystick (e.g., presented on a display screen), and/or other mechanisms. In some implementations, a handheld input device may include one or more motion sensors configured to generate output signals conveying gesture-based inputs. In some implementations, a handheld input device may include a controller. A controller may be in the form of one or more of a remote, a weapon, and/or other handheld devices.

In some implementations, a user may utilize a physical input device to modify the individual values of the height dimension of the individual virtual objects by one or more of selecting a virtual object, making one or more gestures to raise and/or lower the virtual object, and/or other types of input.

By way of non-limiting illustration, the input component 116 may be configured to obtain user input to modify the value of the height dimension of the first virtual object. The content component 108 may be configured to specify the individual values of the height dimension of the individual virtual objects based on the modified individual values. By way of non-limiting illustration, content component 108 may be configured to specify the value of the height dimension of the first virtual object based on the modified value. The control component 114 may be configured to control presentation device 102 to generate the image of the first virtual object having the modified value of the height dimension.

In some implementations, input component 116 may be configured to obtain user input related to a request to perform another iteration of determining a set of vertical displacements between a beacon and presentation device 102 over a period of time, determining an average vertical displacement from the set of vertical displacements, specifying individual values of individual height dimensions of individual virtual object, and/or other operations. In some implementations, such a request may be in response to one or more of a user changing from a standing position to sitting position, the presentation device 102 being used by a user of a first height and then to another user a second height, and/or for other reasons.

By way of non-limiting illustration, input component 116 may be configured to obtain a request to modify the value of the height dimension of the first virtual object. In response to obtaining the request, height component 112 may be configured to determine a second set of vertical displacements between an individual beacon and the presentation device 102 over a second period of time. The height component 112 may be configured to determine a second average vertical displacement from the second set of vertical displacements. The content component 108 may be configured to specify the value of the height dimension and/or other dimensions of the first virtual object based on the second average vertical displacement and/or other information. The control component 114 may be configured to control the presentation device 102 to generate the image of the first virtual object having the value of the height dimension specified based on the second average vertical displacement.

FIGS. 3-7 show various graphical illustrations of one or more implementations of the system of FIG. 1.

Figure 3:
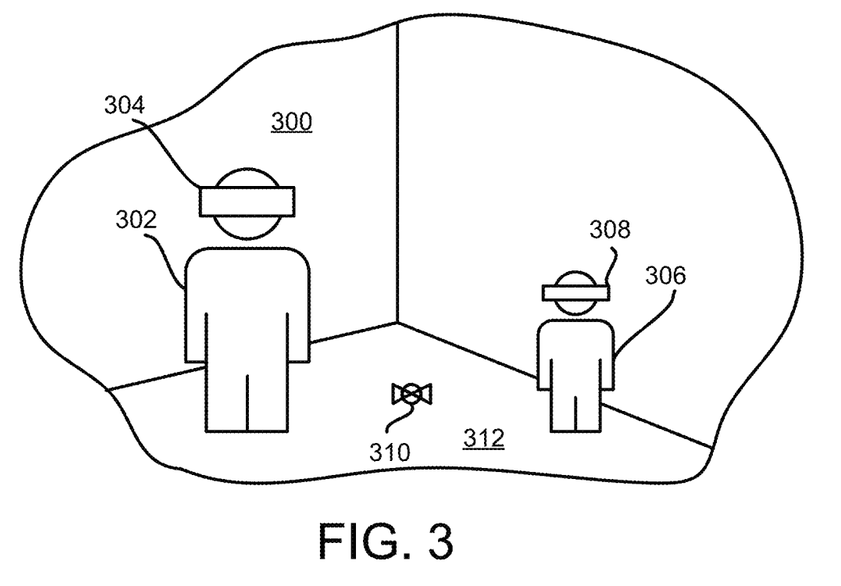
FIG. 3 shows a graphic illustration of an implementation of the system of FIG. 1.

In FIG. 3 shows a graphic illustration of an implementation of the system of FIG. 1. FIG. 3 illustrates an interactive environment 300 including one or more of a first user 302, a first presentation device 304 installed on the head of the first user 302, a second user 306, a second presentation device 308 installed on the head of the second user 306, a beacon 310, and/or other content and/or components. The beacon 310 may be placed on a surface 312 within interactive environment 300.

Figure 4:
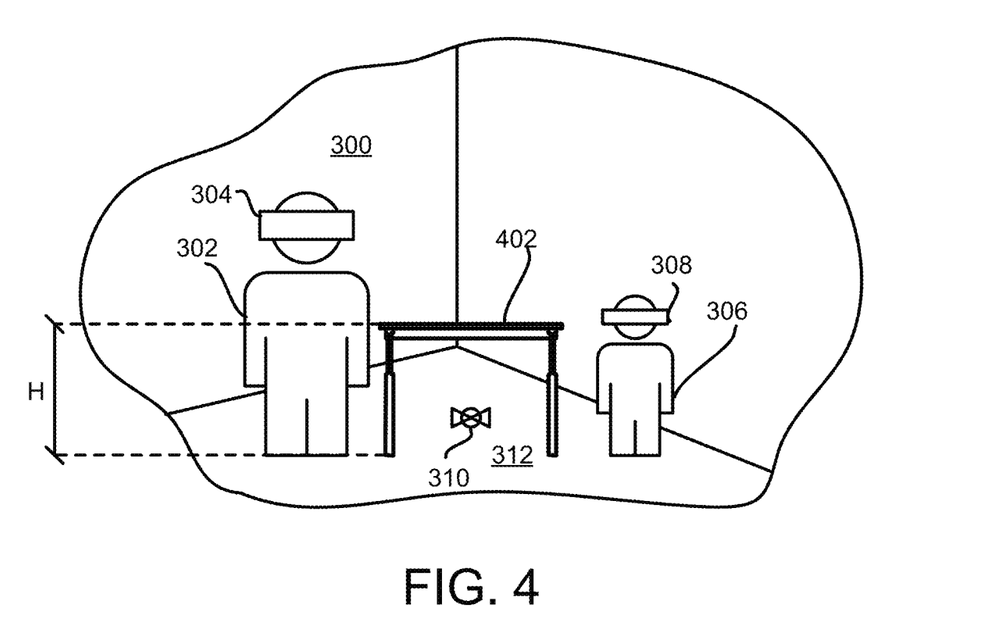
FIG. 4 shows a graphic illustration of an implementation of the system of FIG. 1.

FIG. 4 shows another graphic illustration of an implementation of the system of FIG. 1. In FIG. 4, a virtual object 402 is shown. The virtual object 402 is shown at a default position at rest with respect to surface 312. The default position may be a position at rest it would be held on by gravity if it were a real-world object.

The illustration in FIG. 4 may be an example of how first user 302 may perceive the virtual object 402. By way of non-limiting illustration, the virtual object 402 may have spatial dimensions including a height dimension "H." The height dimension may be a vertical distance the virtual object extends away from the surface 312 in the default position. The height dimension H may be specified based on an average vertical displacement between the beacon 310 and the first presentation device 304 (e.g., representing the first user's height), as described herein.

Figure 5:
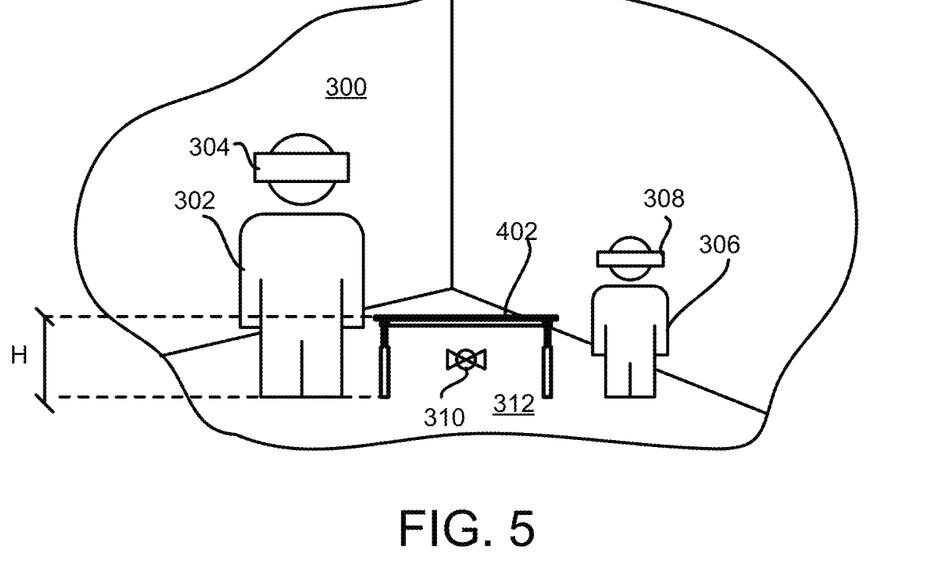
FIG. 5 shows a graphic illustration of an implementation of the system of FIG. 1.

FIG. 5 shows yet another graphic illustration of an implementation of the system of FIG. 1. The illustration in FIG. 5 may be an example of how second user 306 may perceive the virtual object 402. By way of non-limiting illustration, the height dimension H may be specified based on an average vertical displacement between the beacon 310 and the second presentation device 308 (e.g., representing the second user's height), as described herein. As show, since second user 306 may be shorter than first user 302, the second user 306 may perceive the virtual object 402 at a height that may be different (e.g., lower) from how the first user 302 may perceive the virtual object 402.

Figure 6:
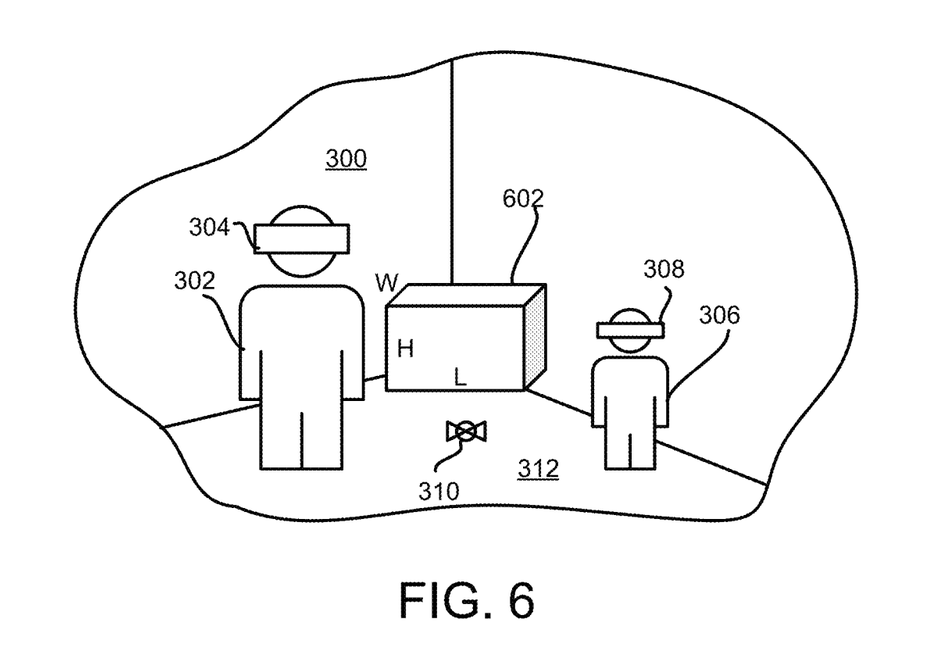
FIG. 6 shows a graphic illustration of an implementation of the system of FIG. 1.

FIG. 6 shows another graphic illustration of an implementation of the system of FIG. 1. The illustration in FIG. 6 may be an example of how the first user 302 may perceive a virtual object 602. The virtual object 402 may have spatial dimensions including one or more of a height dimension "H," a width dimension "W," a length dimension "L," and/or other dimensions. One or more of the height dimension "H," width dimension "W," length dimension "L," and/or other dimensions may be specified based on an average vertical displacement between the beacon 310 and the second presentation device 308 (e.g., representing the first user's height), as described herein. This may represent a scaling of virtual object 602 as a whole based on user height.

Figure 7:
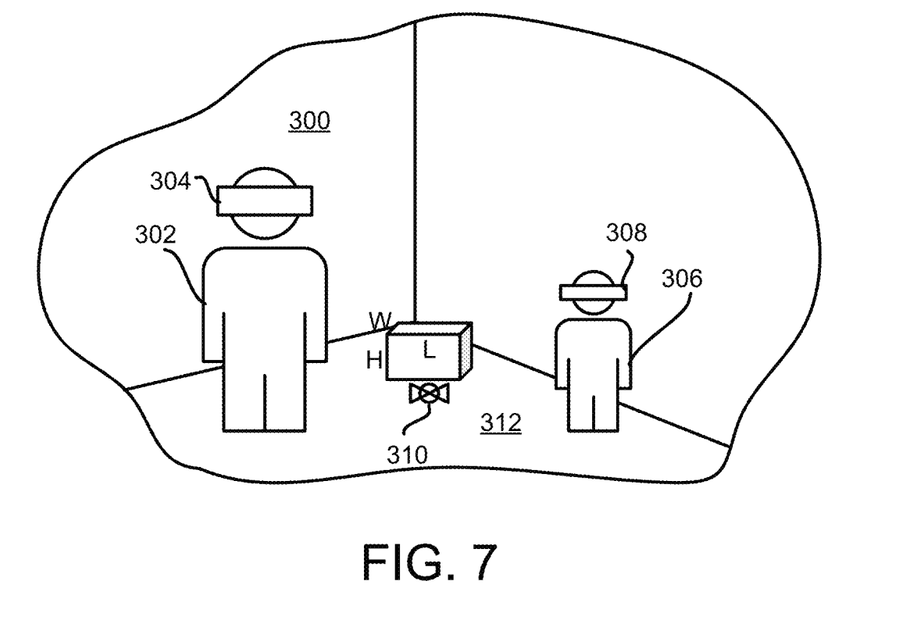
FIG. 7 shows a graphic illustration of an implementation of the system of FIG. 1.

FIG. 7 shows yet another graphic illustration of an implementation of the system of FIG. 1. The illustration in FIG. 7 may be an example of how second user 306 may perceive the virtual object 602. By way of non-limiting illustration, one or more of the height dimension "H," width dimension "W," length dimension "L," and/or other dimensions may be specified based on an average vertical displacement between the beacon 310 and the second presentation device 308 (e.g., representing the second user's height), as described herein. As show, since second user 306 may be shorter than first user 302, the second user 306 may perceive the virtual object 602 at a scale that may be different (e.g., smaller in scale) from how the first user 302 may perceive the virtual object 402.

Returning to FIG. 1, external resources 126 may include sources of information, hosts, and/or providers of information outside of system 100, external entities participating with system 100, and/or other resources. In some implementations, some or all of the functionality attributed herein to external resources 126 may be provided by resources included in system 100. By way of non-limiting illustration, an external entity may include a server configured to provide virtual content information and/or other information.

Presentation device 102 may include communication lines or ports to enable the exchange of information with one or more networks 130. The one or more networks 130 may include wired and/or wireless connections. By way of non-limiting illustration, one or more networks 130 may include one or more of the Internet, wireless Bluetooth Low Energy (BLE), wired Universal Serial Bus (USB) connection, and/or other connections. It will be appreciated that this is not intended to be limiting and that the scope of this disclosure includes implementations in which components of system 100 may be operatively linked via some other communication media.

Illustration of presentation device 102 in FIG. 1 is not intended to be limiting. Presentation device 102 may include a plurality of hardware, software, and/or firmware components operating together to provide the functionality attributed herein to presentation device 102. For example, presentation device 102 may be implemented by a cloud of computing platforms operating together as presentation device 102.

Electronic storage 120 may include electronic storage media that electronically stores information. The electronic storage media of electronic storage 120 may include one or both of system storage that is provided integrally (i.e., substantially non-removable) with presentation device 102 and/or removable storage that is removably connectable to presentation device 102 via, for example, a port or a drive. A port may include a USB port, a firewire port, and/or other port. A drive may include a disk drive and/or other drive. Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 104, information received from external resource(s) 126, and/or other information that enables system 100 to function as described herein.

Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-116. Processor(s) 104 may be configured to execute components 108-114 by software; hardware; firmware; some combination of software, hardware, and/or firmware; and/or other mechanisms for configuring processing capabilities on processor(s) 104.

It should be appreciated that although components 108-116 are illustrated in FIG. 1 as being co-located within a single processing unit, in implementations in which processor(s) 104 includes multiple processing units, one or more of components 108-116 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-116 described above is for illustrative purposes and is not intended to be limiting, as any of components 108-116 may provide more or less functionality than is described. For example, one or more of components 108-116 may be eliminated, and some or all of its functionality may be provided by other ones of components 108-116 and/or other components. As another example, processor(s) 104 may be configured to execute one or more additional components that may perform some or all of the functionality attributed to one of components 108-116.

Figure 2:
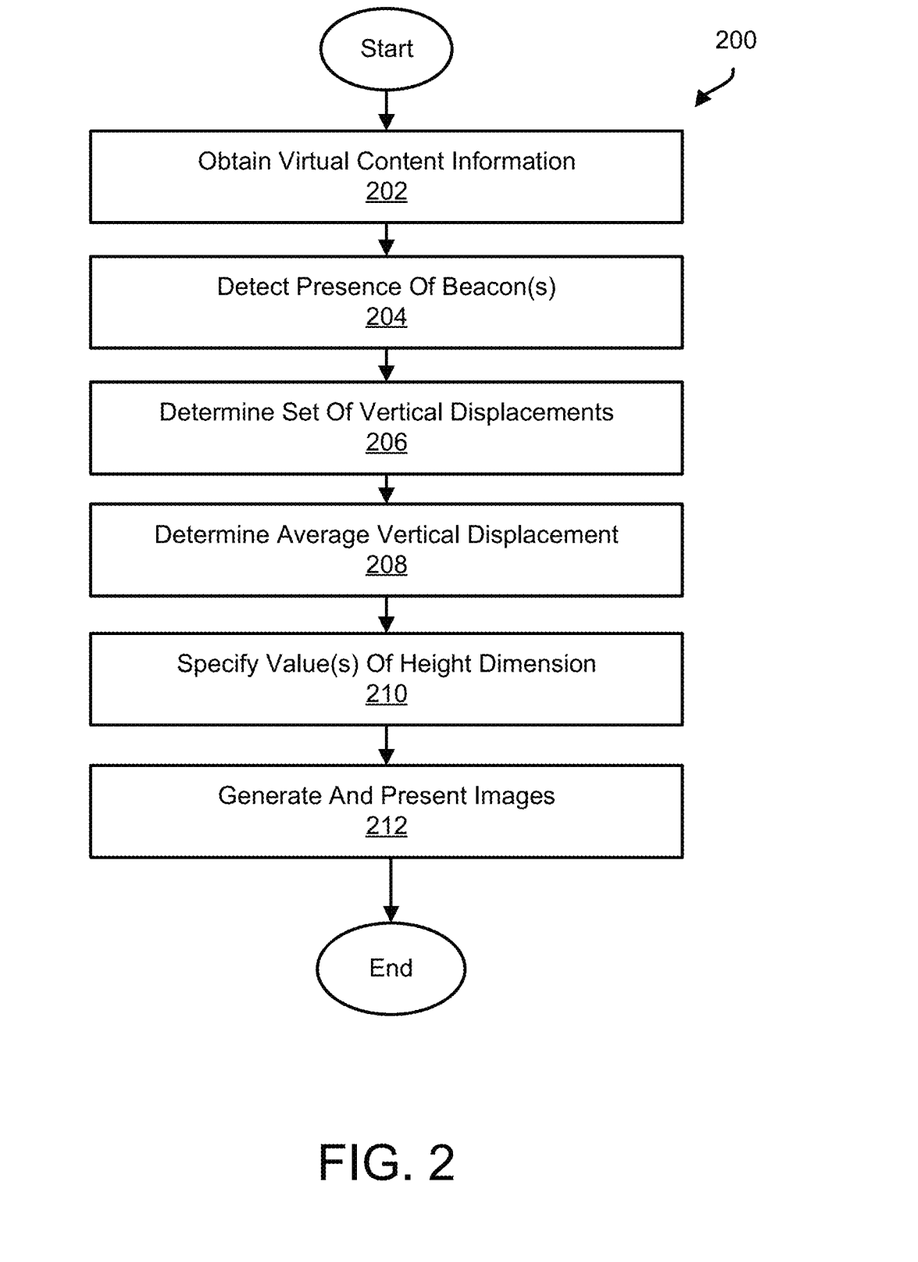
FIG. 2 illustrates a method to adapt an interactive experience based on user height, in accordance with one or more implementations.

FIG. 2 illustrates a method 200 to adapt an interactive experience based on user height, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200. By way of non-limiting illustration, method 200 may be implemented in a presentation device the same as or similar to presentation device 102 (shown in FIG. 1 and described herein).

At an operation 202, virtual content information and/or other information may be obtained. The virtual content information may define virtual content. The virtual content may include one or more virtual objects. Individual virtual objects may have spatial dimensions including a height dimension and/or other dimensions. In some implementations, operation 202 may be performed by one or more physical processors executing a content component the same as or similar to content component 108 (shown in FIG. 1 and described herein).

At an operation 204, presence of one or more beacons within the real-world environment may be detected. In some implementations, operation 204 may be performed by one or more physical processors executing a detection component the same as or similar to detection component 110 (shown in FIG. 1 and described herein).

At an operation 206, a set of vertical displacements between the beacon and the presentation device may be determined over a period of time. In some implementations, operation 206 may be performed by one or more physical processors executing a height component the same as or similar to height component 112 (shown in FIG. 1 and described herein).

At an operation 208, an average vertical displacement from the set of vertical displacements may be determined. In some implementations, operation 208 may be performed by one or more physical processors executing a height component the same as or similar to height component 112 (shown in FIG. 1 and described herein).

At an operation 210, a value of the height dimension of a first virtual object may be specified based on the average vertical displacement. In some implementations, operation 210 may be performed by one or more physical processors executing a content component the same as or similar to content component 108 (shown in FIG. 1 and described herein).

At an operation 212, images of the virtual content may be generated and presented such that the virtual content may be perceived by a user as being located in a real-world environment. By way of non-limiting illustration, an image of the first virtual object having the value of the height dimension specified based on the average vertical displacement may be generated and presented. In some implementations, operation 212 may be performed by one or more physical processors executing a control component the same as or similar to control component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to adapt an interactive experience based on user height, the system comprising:
    non-transitory electronic storage configured to store virtual content information, the virtual content information defining virtual content, the virtual content including one or more virtual objects, individual virtual objects having spatial dimensions including a height dimension;
    a presentation device configured to be installed on a head of a user, the presentation device being configured to generate images of the virtual content and present the images such that the virtual content is perceived by the user as being located in a real-world environment;
    one or more physical processors configured by the machine-readable instructions to:
        detect presence of a beacon within the real-world environment, wherein the beacon is presented in the real-world environment and includes a light source that indicates a reference point for the beacon within the real-world environment;
        determine a set of vertical displacements between the beacon and the presentation device over a period of time;
        determine an average vertical displacement from the set of vertical displacements;
        specify a value of the height dimension of a first virtual object based on the average vertical displacement; and
        control the presentation device to generate an image of the first virtual object having the value of the height dimension specified based on the average vertical displacement.

2. The system of claim 1, wherein the one or more physical processors are further configured by the machine-readable instructions to:
    responsive to the average vertical displacement being a first value, specify the value of the height dimension of the first virtual object as a fraction of the first value; and
    responsive to the average vertical displacement being a second value, specify the value of the height dimension of the first virtual object as the fraction of the second value.

3. The system of claim 1, wherein the one or more physical processors are further configured by the machine-readable instructions to:
    obtain user input to modify the value of the height dimension of the first virtual object; and
    specify the value of the height dimension of the first virtual object based on the modified value; and
    control the presentation device to generate the image of the first virtual object having the modified value of the height dimension.

4. The system of claim 1, wherein the one or more physical processors are further configured by the machine-readable instructions to:
    obtain a request to modify the value of the height dimension of the first virtual object;
    in response to obtaining the request, determine a second set of vertical displacements between the beacon and the presentation device over a second period of time;
    determine a second average vertical displacement from the second set of vertical displacements;
    specify the value of the height dimension of the first virtual object based on the second average vertical displacement; and
    control the presentation device to generate the image of the first virtual object having the value of the height dimension specified based on the second average vertical displacement.

5. The system of claim 1, further comprising:
    one or more sensors configured to generate output signals conveying depth information, the depth information including depth or range of points on real-world surfaces from the one or more sensors; and
    wherein the one or more physical processors are further configured by the machine-readable instructions to determine the set of vertical displacements from the depth information.

6. The system of claim 1, wherein:
    the first virtual object has a default position at rest and with respect to a surface in the real-world environment it would be held on, by gravity, if it were a real-world object, and the height dimension of the first virtual object is a vertical distance the first virtual object extends away from the surface in the default position; and
    values of other spatial dimensions are specified without regard to the average vertical displacement.

7. The system of claim 1, further comprising:
    one or more sensors configured to generate output signals conveying image information, the image information defining images of the real-world environment within a field of view of the image sensor; and
    wherein the one or more physical processors are further configured by the machine-readable instructions to detect presence of the beacon within the real-world environment from the image information.

8. The system of claim 1, wherein the individual virtual objects further have one or more other spatial dimensions; and
    the one or more physical processors are further configured by the machine-readable instructions to:
    specify individual values of the one or more other spatial dimensions of the first virtual object based on the average vertical displacement.

9. The system of claim 1, wherein detecting the presence of a beacon within the real-world environment includes detecting a light emitted from the light source of the beacon.

10. A system configured to adapt an interactive experience based on user height, the system comprising:
    non-transitory electronic storage configured to store virtual content information, the virtual content information defining virtual content, the virtual content including one or more virtual objects, individual virtual objects having spatial dimensions including a height dimension;
    a presentation device configured to be installed on a head of a user, the presentation device being configured to generate images of the virtual content and present the images such that the virtual content is perceived by the user as being located in a real-world environment;
one or more physical processors configured by the machine-readable instructions to:
  detect presence of a beacon within the real-world environment;
  determine a set of vertical displacements between the beacon and the presentation device over a period of time;
  determine an average vertical displacement from the set of vertical displacements;
  specify a value of the height dimension of a first virtual object based on the average vertical displacement;
  control the presentation device to generate an image of the first virtual object having the value of the height dimension specified based on the average vertical displacement;
  responsive to the average vertical displacement being a first value, specify the value of the height dimension of the first virtual object as a fraction of the first value;
  responsive to the average vertical displacement being a second value, specify the value of the height dimension of the first virtual object as the fraction of the second value; and
  wherein the fraction is between ⅔ and ¾, inclusive.

11. A method to adapt an interactive experience based on user height, the method comprising:
  obtaining virtual content information, the virtual content information defining virtual content, the virtual content including one or more virtual objects, individual virtual objects having spatial dimensions including a height dimension;
  generate images of the virtual content and present the images such that the virtual content is perceived by a user as being located in a real-world environment;
  detecting presence of a beacon within the real-world environment, wherein the beacon is presented in the real-world environment and includes a light source that indicates a reference point for the beacon within the real-world environment;
  determining a set of vertical displacements between the beacon and the presentation device over a period of time;
  determining an average vertical displacement from the set of vertical displacements;
  specifying a value of the height dimension of a first virtual object based on the average vertical displacement; and
  generating an image of the first virtual object having the value of the height dimension specified based on the average vertical displacement.

12. The method of claim 11, further comprising:
  responsive to the average vertical displacement being a first value, specifying the value of the height dimension of the first virtual object as a fraction of the first value; and
  responsive to the average vertical displacement being a second value, specifying the value of the height dimension of the first virtual object as the fraction of the second value.

13. The method of claim 11, further comprising:
  obtaining user input to modify the value of the height dimension of the first virtual object;
  specifying the value of the height dimension of the first virtual object based on the modified value; and
  generating the image of the first virtual object having the modified value of the height dimension.

14. The method of claim 11, further comprising:
  obtaining a request to modify the value of the height dimension of the first virtual object;
  in response to obtaining the request, determining a second set of vertical displacements between the beacon and the presentation device over a second period of time;
  determining a second average vertical displacement from the second set of vertical displacements;
  specifying the value of the height dimension of the first virtual object based on the second average vertical displacement and not the average vertical displacement; and
  generating the image of the first virtual object having the value of the height dimension specified based on the second average vertical displacement.

15. The method of claim 11, further comprising:
  generating output signals conveying depth information, the depth information including depth or range of points on real-world surfaces from one or more sensors; and
  determining the set of vertical displacements from the depth information.

16. The method of claim 11, wherein:
  the first virtual object has a default position at rest and with respect to a surface in the real-world environment it would be held on, by gravity, if it were a real world object, and the height dimension of the first virtual object is a vertical distance the first virtual object extends away from the surface in the default position; and
  values of other spatial dimensions are specified without regard to the average vertical displacement.

17. The method of claim 11, further comprising:
  generating output signals conveying image information, the image information defining images of the real-world environment within a field of view of an image sensor; and
  detecting presence of the beacon within the real-world environment from the image information.

18. The method of claim 11, wherein the individual virtual objects further have one or more other spatial dimensions, the method further comprises:
  specifying individual values of the one or more other spatial dimensions of the first virtual object based on the average vertical displacement.

19. The method of claim 11, wherein detecting the presence of a beacon within the real-world environment includes detecting a light emitted from the light source of the beacon.

20. A method to adapt an interactive experience based on user height, the method comprising:
  obtaining virtual content information, the virtual content information defining virtual content, the virtual content including one or more virtual objects, individual virtual objects having spatial dimensions including a height dimension;
  generate images of the virtual content and present the images such that the virtual content is perceived by a user as being located in a real-world environment;
  detecting presence of a beacon within the real-world environment;
  determining a set of vertical displacements between the beacon and the presentation device over a period of time;
  determining an average vertical displacement from the set of vertical displacements;
  specifying a value of the height dimension of a first virtual object based on the average vertical displacement;

generating an image of the first virtual object having the value of the height dimension specified based on the average vertical displacement;

responsive to the average vertical displacement being a first value, specifying the value of the height dimension of the first virtual object as a fraction of the first value;

responsive to the average vertical displacement being a second value, specifying the value of the height dimension of the first virtual object as the fraction of the second value; and wherein the fraction is between ⅔ and ¾, inclusive.

* * * * *